United States Patent

[11] 3,619,221

| | | |
|---|---|---|
| [72] | Inventor | Theophilos G. Kossivas<br>Arlington, Mass. |
| [21] | Appl. No. | 22,680 |
| [22] | Filed | Mar. 25, 1970 |
| [45] | Patented | Nov. 9, 1971 |
| [73] | Assignee | W. R. Grace & Co.<br>Cambridge, Mass. |

[54] AMINE FORMATE ACCELERATOR ADDITIVES FOR PORTLAND CEMENT COMPOSITIONS
20 Claims, No Drawings

[52] U.S. Cl.................................................. 106/90,
106/315
[51] Int. Cl............................................... C04b 13/26
[50] Field of Search........................................ 106/90,
315, 314

[56] References Cited
UNITED STATES PATENTS

| | | | |
|---|---|---|---|
| 3,443,976 | 5/1969 | Dodson et al.................. | 106/315 |
| 3,210,207 | 10/1965 | Dodson et al................... | 106/315 |
| 3,094,425 | 6/1963 | Adams et al.................. | 106/315 |
| 3,053,674 | 9/1962 | Liberthson................... | 106/315 |
| 3,053,673 | 9/1962 | Walker........................ | 106/315 |

*Primary Examiner*—Tobias E. Levow
*Assistant Examiner*—W. T. Scott
*Attorneys*—C. E. Parker, William L. Baker and Metro Kalimon

ABSTRACT: Water-soluble salts of amines and formic acid are added to Portland cement compositions (e.g. concrete) to accelerate the setting time thereof. The additives exhibit a particular effectiveness for offsetting the set-retardation effect of water-reducing, set-retarding agents, (e.g. lignosulfonates) employed in Portland cement compositions.

AMINE FORMATE ACCELERATOR ADDITIVES FOR PORTLAND CEMENT COMPOSITIONS

This invention relates to the control of the rate of hydration of Portland cement compositions. In a particular aspect, this invention concerns an additive for incorporation in hydratable Portland cement compositions such as Portland cement concrete to accelerate the setting time thereof. In another aspect the additive is incorporated in such cement compositions in combination with other additives to give Portland cement compositions which ideally exhibit a desired rate of hydration and enhanced compressive strength.

It is often desirable to hasten the rate of hydration or setting of a Portland cement composition such as Portland cement concrete, during the winter months, for example, when the fluid concrete mix is to be placed while exposed to damaging low temperatures. Acceleration of the rate of hydration of such compositions is commonly effected by the incorporation of certain chemical a additives. Materials which accelerate the setting of Portland cement have also been employed in settable Portland cement compositions to offset extreme set retardation effects resulting from the use of water-reducing, set-retarding agents that are incorporated in such compositions to increase the workability and placeability of the composition and/or to enhance the compressive strength of the set composition. The use of a set-accelerating agent in combination with such water-reducing, set-retarding agents provides an effective method of producing a higher strength cement composition (or achieving a mix having a given strength using less cement), yet possessing a desired fluidity or placeability and a desirable setting time.

Of the various known materials for accelerating the rate of hydration of Portland cement compositions, calcium chloride has been most widely used in practice due to its effectiveness, availability and low-cost. However, the presence of calcium chloride in structural Portland cement concrete has been associated with undesirable shrinkage of the set concrete and corrosion of metallic structural parts imbedded in the concrete. The use, therefore, of calcium chloride in, for example, prestressed concrete having steel imbedded therein is generally discouraged.

In U.S. Pat. No. 3,210,207 there is described a noncorrosive additive for accelerating the rate of retardation of hydraulic cement compositions comprising calcium formate and a minor amount of a corrosion inhibitor such as calcium chromate. The calcium formate-containing additive was shown to be much less corrosive than calcium chloride in cement mixes, and desirably, not shown to adversely affect the extended or overall compressive strength of the mixes.

A set-accelerating additive for incorporation in Portland cement compositions has now been found which also avoids the severe corrosion problems associated with the use of calcium chloride. Moreover, increases in the extended or overall compressive strength of set Portland cement concrete containing the additive have been noted. Additionally, the additive of the invention, when used in combination with water-reducing, set-retarding agents in Portland cement compositions, exhibits a surprisingly high-effectiveness for offsetting the extended retardation effect due to the presence of such agents.

The set-accelerating additive of the invention comprises a water-soluble salt of formic acid and an amine. The water soluble formate salts employed in the invention are obtained by adding the formic acid to the amine, or the amine to the acid at, for example, room temperature until a substantially neutral reaction product, i.e., a pH of about 7, is obtained. It should be understood that while the formation of the water-soluble salt of formic acid and the amine is the primary and predominant product of the reaction, some formation of an amide of the amine and formic acid is probable, either initially during the reaction or upon standing of the reaction product over a period of time, and therefore the formate additive of the invention may contain a minor amount of amide in some instances.

The amines employed to form the additive of the invention should be capable of forming a water-soluble salt with formic acid. The amines generally may contain up to about 20, preferably about 3 to about 8, carbon atoms in their structural formula. Suitable amines for use in preparing the additive of the invention include primary, secondary and tertiary mono- and polyamines such as aliphatic, including cycloaliphatic, mono- and polyamines, for example, isopropylamine, n-propylamine, diisopropylamine, n-butylamine, di-n-butylamine, tri-n-butylamine, triethylamine, cyclohexylamine, ethylene diamine, diethylene triamine, triethylene tetramine, tetraethylene pentamine, etc.; heterocyclic N- containing mono- and polyamines, for example, morpholine, N-methylmorpholine, 4(2-aminoethoxy) ethylmorpholine, 2-(4-morpholinylethoxy) ethanol, bis-2-(4-morpholinyl) ethyl ether, piperazine, N-aminoethylpiperazine, N-hydroxy-ethyl-piperazine, pyridazine, pyrrole, pyrrolidine, pyridine, piperadine, pyrimidine, pyridazine, etc. Mixtures of the foregoing such as residue products resulting from the commercial production of pure or essentially pure amines are especially desirable for use in preparing the additive of the invention due to the relative low-cost of such products.

Preferred amines for use in forming the additive of the invention include those amines which are substantially non-hydroxyl containing. Formate salts of amines such as triethanolamine which contain a substantial amount of free hydroxyl groups in the molecule, while efficacious in a majority of Portland cement concretes, were found to unexpectedly rapidly accelerate the initial setting time of concrete prepared using certain Portland cements. Such rapid initial setting or "flash-setting" often occurred unexpectedly in as little as 20 minutes following the addition of the additive and the water to the particular compositions. This unpredictable rapid acceleration would obviously be especially undesirable to producers of wet, premixed Portland cement concrete who must transport the wet mix to the construction site. "Flash-setting" can also adversely affect the overall or extended compressive strength of the set concrete.

The amount of the formate additive of the invention employed will vary according to the degree of acceleration of the setting time of the cement composition desired. Generally, an amount ranging from about 0.01 to about 10, preferably about 0.1 to 2 percent by weight, based upon the weight of the dry cement is employed.

As aforementioned, the set-accelerating additive of the invention is advantageously employed in Portland cement compositions in combination with water-reducing, set-retarding agents to offset the extended set-retardation effects of such agents. Any of the known water-soluble, water-reducing set-retarding agents can be employed in combination with the additive of the invention including carbohydrates such as monosaccharides, for example, glucose and fructose; disaccharides, for example, lactose and sucrose; trisaccharides, for example, raffinose; polysaccharides, for example, starch and cellulose, as well as derivatives thereof such as pregelatinized starch, dextrin, corn syrup and carboxymethylcellulose; polyhydroxy polycarboxylic compounds such as tartaric acid and mucic acid; lignosulfonic acid and salts thereof such as calcium, magnesium, ammonium and sodium lignosulfonate; water-soluble salts of boric acid, such as the alkali metal salts thereof; and water-soluble silicone compounds; as well as mixtures thereof. The aforementioned water-reducing agents are generally employed in the art in an amount ranging between about 0.01 and 10, and most often between about 0.1 and 3 weight percent based upon the weight of the dry cement.

Additive compositions for use in Portland cement compositions to enhance compressive strength without greatly extending the setting time thereof have been produced according to the present invention which may contain from 10 to 90, preferably about 25 to 50, weight percent, based on the total weight of the composition, of the formate additive of the invention and from about 10 to 90, preferably about 50 to 75, weight percent of water-reducing, set-retarding agent. Such additive compositions can be employed generally in an amount of about 0.01 to 10, preferably about 0.01 to 3, weight percent of the dry cement. Conventional additional components such as preservatives, etc., also can be included in the additive composition.

The following examples further illustrate the present invention and should not be considered limiting:

EXAMPLE I 80.0 parts by weight of a mixture of primarily aliphatic and heterocyclic N-containing mono- and diamines obtained as a coproduct from a commercial process for the production of heterocyclic amines was neutralized (pH 7.0–7.2) with 19.2 parts by weight of formic acid. The major constituents of the amine coproduct mixture upon analysis were shown to be 4-(2-aminoethoxy) ethylmorpholine, 2-(4-morpholinylethoxy) ethanol and bis-2(4-morpholyinyl) ethyl ether.

The amine formate product obtained in example I was tested for its effect on the setting time and the compressive strength of Portland cement concrete containing water and aggregate. The concrete was prepared and tested in this test and all of the tests which follow according to the procedures specified in ASTM C-494. A Type II Portland cement was used to make the concrete except where otherwise noted. For comparison, tests were conducted on a blank sample containing no additive as well as samples containing calcium formate as an accelerating additive. The results are reported in table I.

TABLE I

| Additive | Addition rate [1] | Initial setting time acceleration over blank (hrs.:min.) | 1 day strength | 7 day strength | 28 day strength |
| --- | --- | --- | --- | --- | --- |
| | | | 1,650 | 4,008 | 5,315 |
| Product of Example I | 0.3 | 0:10 | 2,041 | 4,862 | 5,816 |
| | 1.0 | 0:16 | | | |
| | 2.0 | 0:29 | | | |
| Calcium formate | 1.0 | 0:10 | | | |
| | 2.0 | 1:05 | 1,900 | 3,800 | 5,006 |

[1] Weight percent, based on the weight of the dry cement.

From the data given in table I, it is seen that in addition to being an effective set-accelerator, the additive of the invention, unlike the calcium formate additive, increased the 7 and 28 day strength of the concrete composition.

The additives tested in table I were further tested to determine each additive's capability of offsetting the set-retardation effect of a water-reducing, set-retarding agent, corn syrup, in a Portland cement concrete composition. The data shown in table II below is the average setting time of six test runs for each additive on identical compositions and for the blank. The concretes were prepared using types I, II and III Portland cement.

TABLE II

| Additive [1] | | | Initial setting time (hrs.:min.) |
| --- | --- | --- | --- |
| Corn syrup | Product of Example I | Calcium formate | |
| 0.18 | | | 6:15 |
| 0.18 | | 0.18 | 5:30 |
| 0.18 | | 1.50 | 0:30 |
| 0.18 | 0.18 | | 2:00 |
| 0.18 | 0.42 | | 1:20 |
| 0.18 | 1.15 | | 0:15 |

[1] Weight percent, based on the weight of the dry cement.

The data reported in table II demonstrates the exceptionally high-effectiveness of the additive of the invention in offsetting the retardation effect of the corn syrup.

The unexpected nature of the ability of the additive of the invention to offset retardation in such a significant manner is further demonstrated in table III below which compares the initial and final setting times of a Portland cement concrete composition containing the formate reaction product of example I with the same compositions containing each of the amine and acid reactants of example I separately. The concretes were prepared using a type I Portland cement.

TABLE III

| Additive [1] | | | | Setting time [2] | |
| --- | --- | --- | --- | --- | --- |
| Corn syrup | Product of Example I | Amine reactant of Example I | Formic acid | Initial | Final |
| 0.15 | | | | 5:45 | 6:00 |
| 0.15 | 0.18 | | | 1:50 | 1:50 |
| 0.15 | | 0.14 | | 5:30 | 5:35 |
| 0.15 | | 0.18 | | 5:25 | 5:35 |
| 0.15 | | | 0.02 | 4:55 | 5:30 |
| 0.15 | | | 0.18 | 4:30 | 5:05 |

[1] Weight percent based on the weight of the dry cement.
[2] Hours:minutes.

EXAMPLE II 67 parts by weight of triethylamine is neutralized (pH 7.0–7.2) by the addition thereto of 33 parts by weight of formic acid.

EXAMPLE III 66 parts by weight of cyclohexylamine is neutralized (pH7.0–7.2) by the addition thereto of 34 parts by weight of formic acid.

EXAMPLE IV 68.1 parts by weight of a mixture of polyethyleneamines obtained as a coproduct from a commercial production of ethylene amines (ethylene diamine, diethylene triamine, triethylene tetramine, tetraethylene pentamine) and containing about 24 to 28 percent by weight diethylene triamine is neutralized (pH 7.0–7.2) with 31.9 parts by weight of formic acid.

EXAMPLE V 57.5 parts by weight of a mixture of aliphatic and heterocyclic N-containing polyamines obtained as a residue product from a commercial operation is neutralized (pH 7.0–7.2) with 42.5 parts by weight of formic acid. Analysis of the major constituents of the amine mixture gave the following approximate composition:

| | Wt % of Total |
| --- | --- |
| diethylene triamine | 2–8 |
| N-aminoethylpiperazine | 10–20 |
| N-aminoethylethanolamine | 5–15 |
| N-hydroxyethylpiperazine | 5–15 |
| higher homologues | 55–75 |

Example VI

Four additive compositions were prepared by mixing 40 parts by weight, based on the total weight of the composition, of each of the neutralization products obtained in example II–V with 60 parts by weight of corn syrup. When tested in Portland cement concretes prepared using types I, II and III Portland cement, in the foregoing manner, all of the concretes containing the additive compositions exhibited an initial setting time which was much less than to be expected due to the presence of the corn syrup water-reducing set-retarder as well as enhanced 1, 7, and 28 day compressive strengths as compared to the blank concrete mixes containing no additives.

EXAMPLE VII

An additive composition was prepared containing 25 percent by weight, based on the total weight of the composition, of the neutralization product obtained in example I, 50 percent by weight of sodium lignosulfonate and 25 percent by weight of a mixture of glucose and inverted sucrose. When added to a Portland cement concrete prepared with a type I Portland cement in an amount of 0.25 weight percent, based on the dry weight of the cement, and tested in the foregoing manner, the concrete containing the additive composition exhibited an initial setting time which was much less than to be expected due to the presence of the water-reducing, set-retarding agents and an enhanced 1, 7 and 28 day compressive strength as compared to the blank concrete mix containing no additive.

It is claimed:

1. A cementing composition consisting essentially of Portland cement and about 0.01 to 10 weight percent, based on the weight of said cement, of a water-soluble amine formate salt formed by the reaction of an amine and formic acid.

2. The composition of claim 1 wherein the amine contains up to about 20 carbon atoms.

3. The composition of claim 1 wherein said amine is a substantially nonhydroxyl containing amine.

4. A settable Portland cement mix consisting essentially of Portland cement, aggregate, water and a water-soluble amine formate salt formed by the reaction of an amine and formic acid, said salt being present in an amount sufficient to accelerate the setting time of said mix.

5. A settable Portland cement composition consisting essentially of Portland cement, water, about 0.01 to 10 weight percent of a water-soluble amine formate salt formed by the reaction of an amine and formic acid, and about 0.01 to 10 weight percent of a water-soluble, water-reducing, set-retarding agent for said composition, said amounts being based upon the weight of the cement and the amount of said formate being sufficient to offset the set-retardation effect of said water-reducing, set-retarding agent.

6. The composition of claim 5 wherein said amine contains up to about 20 carbon atoms and is selected from the group consisting of aliphatic amines, heterocyclic N-containing amines and mixtures thereof.

7. The composition of claim 5 wherein said water-reducing, set-retarding agent is selected from the group consisting of carbohydrates, polyhydroxy polycarboxylic acids, lignosulfonic acid and salts thereof, salts of boric acid, silicones, and mixtures of the foregoing.

8. The composition of claim 5 wherein the amount of said salt ranges between about 0.1 and 2 weight percent and the amount of said water-reducing agent, set-retarding agent ranges between about 0.1 and 3 weight percent.

9. An additive composition for settable Portland cement compositions, said additive composition consisting essentially of from about 10 to 90 weight percent of a water-soluble amine formate salt formed by the reaction of an amine and formic acid, and about 10 to 90 weight percent of a water-soluble, water reducing, set-retarding agent for said Portland cement composition, said amounts being based upon the weight of the additive composition and the amount of said formate being sufficient to offset the set-retardation effect of said water-reducing, set-retarding agent.

10. The composition of claim 9 wherein said amine contains up to about 20 carbon atoms.

11. The composition of claim 9 wherein said agent is selected from the group consisting of corn syrup, lignosulfonic acid and salts thereof, glucose, sucrose, and mixtures thereof.

12. A settable Portland cement composition consisting essentially of Portland cement, water, aggregate, from about 0.1 to 2 percent by weight of a water-soluble amine formate salt formed by the reaction of an amine containing up to about 20 carbon atoms, and formic acid, and from about 0.1 to 3 weight percent of a water-soluble, water-reducing, set-retarding agent selected from the group consisting of carbohydrates, polyhydroxy polycarboxylic acids, lignosulfonic acid and salts thereof, salts of boric acid, silicones, and mixtures thereof, said amounts being based upon the weight of the cement and the amount of said formate being sufficient to offset the set-retardation effect of said water-reducing, set-retarding agent.

13. An additive composition for incorporation in settable Portland cement compositions, said additive composition consisting essentially of from about 10 to 90 weight percent of a water-soluble amine formate salt formed by the reaction of a substantially nonhydroxyl containing amine containing up to about 20 carbon atoms and formic acid, and about 10 to 90 weight percent of a water-soluble, water-reducing, set-accelerating agent for said Portland cement composition selected from the group consisting of carbohydrates, polyhydroxy polycarboxylic acids, lignosulfonic acid and salts thereof, salts of boric acid, silicones, and mixtures thereof, said amounts being based upon the total weight of said additive composition and the amount of said formate being sufficient to offset the set-retardation effect of said water-reducing, set-retarding retarding agent.

14. The additive composition of claim 13 wherein said amine comprises a mixture of aliphatic and heterocyclic N-containing amines.

15. THe additive composition of claim 13 wherein said amine is triethylamine.

16. The additive composition of claim 13 wherein said amine is cyclohexylamine.

17. The additive composition of claim 13 wherein said amine comprises a mixture of polyethylene amines.

18. The additive composition of claim 13 wherein said agent is corn syrup.

19. The additive composition of claim 13 wherein said agent is a salt of lignosulfonic acid.

20. The additive composition of claim 13 wherein said agent is a mixture of glucose and sucrose.

* * * * *